United States Patent [19]

Jordan

[11] 4,420,674

[45] Dec. 13, 1983

[54] PROCEDURE AND DEVICE FOR WELDING STUDS AND SIMILAR PARTS TO A WORK PIECE

[75] Inventor: Ernst G. Jordan, Menden, Fed. Rep. of Germany

[73] Assignee: OBO Bettermann OHG, Fed. Rep. of Germany

[21] Appl. No.: 323,727

[22] Filed: Nov. 23, 1981

[30] Foreign Application Priority Data

Mar. 9, 1981 [DE] Fed. Rep. of Germany ....... 3108840

[51] Int. Cl.³ ........................... B23K 9/12; B23K 9/20
[52] U.S. Cl. ......................................... 219/99; 219/98; 219/125.1
[58] Field of Search ......................... 219/98, 99, 125.1

[56] References Cited

U.S. PATENT DOCUMENTS

3,303,318  2/1967  Spisak .................................... 219/98
4,145,596  3/1979  Pignal .................................... 219/98
4,307,279  12/1981  Inoue et al. ....................... 219/69 W

FOREIGN PATENT DOCUMENTS

8006621  7/1980  Fed. Rep. of Germany .

Primary Examiner—B. A. Reynolds
Assistant Examiner—Alfred S. Keve
Attorney, Agent, or Firm—Jacobs & Jacobs

[57] ABSTRACT

Stud-welding device and procedure to mold a stud to a workpiece, adapted to weld studs with different dimensions, changing continuously, using an automatic stud-welding device, the device being mechanically fed studs in a stud holder, individually and in the correct position, and the stud holder being held by the stud-welding device, guided to the welding position, and the stud is welded to the workpiece, after which the stud-welding device returns the stud holder to the transfer position, in order to take on another stud and to achieve such several stud holders are assigned to the stud-welding device and alternatively connected to the stud-welding device in accordance with a selectable call-up program, so that a given stud-holder, equipped with a stud and connected to the stud-welding device, is separated from the stud-welding device after the weld has been performed thereon and the transfer position has been reached and held in that location, the operating sequence being controlled electrically or electronically.

16 Claims, 10 Drawing Figures

PROCEDURE AND DEVICE FOR WELDING STUDS AND SIMILAR PARTS TO A WORK PIECE

The invention concerns a procedure for welding studs and similar parts to a work piece by means of a stud-welding device that operates at least semiautomatically, wherein the studs are supplied mechanically from the outside, individually and in the correct position, to a stud holder; the stud-welding device holds the stud holder, moves it to the welding position and welds the stud, whereupon the stud-welding device returns the stud holder to the transfer position, in order to pick up another stud.

A device that operates according to the procedure described at the outset is known through DE-Gm No. 80 06 621.

In that case, the feed of the studs does not proceed through the welding head to the stud holder, but instead the studs are inserted from outside into the feed opening of the stud holder. For automatic-transfer purposes, the known stud-welding device is equipped with a transfer station for the studs, to which the studs are fed by means of a feed hose, oriented with their arcing tip forward, after which the transfer station and the welding head of the stud-welding device are pivoted toward each other. In this fashion, the stud, via a longitudinal translation of the stud holder toward the stud held by the transfer station, is inserted (by pneumatic means, for instance) in the correct position into the stud holder and is clamped tight. This type of transfer suffers from the disadvantage that the studs may not be fed, for instance, with a vibrator, with shank hanging downward and with the arcing tip oriented upward; instead, the studs must be positioned in the transfer station in inverse orientation. Since the studs are normally equipped with a circular flange close to the arcing tip, a stud so fed wobbles in its guides and is therefore relatively difficult to feed into the stud holder. Furthermore, it is necessary to include a separate transfer station for transferring the stud from the feeding device—e.g. a hose—to the stud holder. Furthermore, this transfer station is located in the welding plane, so that it interferes with the feed of the workpieces to be equipped with studs.

A significant disadvantage of this known operating procedure and/or device is that, according to prior art, several welding devices must be arranged consecutively, if various studs of different dimensions are to be welded.

On this basis, it is the purpose of the invention to create procedure and a device with which procedure and/or device studs of the most differing sizes and dimensions may be welded, while continuously changing said sizes and dimensions. The field of application, according to the purpose of the invention, includes, for instance, NC positioning devices in the manufacture of electrical apparatus, etc.

In order to fulfill the purpose of the invention, it is proposed, starting from the initially described procedure, that several stud holders be associated with the stud-welding device, said stud holders being alternatively connected to the stud-welding device in accordance with a selectable call-up program, so that the respective stud holder, equipped with a stud and connected to the stud-welding device, is separated from the stud-welding device, after the weld has been performed and the transfer position has been reached, and is held in that location; this procedural sequence being controlled electrically or electronically.

In this fashion, it becomes possible to weld continuously with a single stud-welding device studs of entirely different dimensions. In accordance with the call-up program, the stud-welding device picks up each predetermined holder, including the stud inserted in it, and carries out the welding procedure. The empty stud holder is then returned into the transfer position and is separated from the stud-welding device, so that the stud-welding device may then pick up the next stud holder, in accordance with the call-up program. This operating manner means a considerable reduction in the amount of stud-welding devices, as previously required, and/or a considerable reduction in welding time.

It is furthermore particularly advantageous that, in order to separate the stud holder from the stud-welding device, the stud holder be axially inserted into a holding device; that said stud holder be equipped with the next stud, synchronously during said insertion; and that the studs be picked up directly from the feed device.

The particular advantage of this procedure lies in the fact that the motion required to separate the stud holder is simultaneously utilized to equip the respective stud holder with the next stud. This has a favorable effect on the operating rate of the procedure.

Furthermore, the invention aims at a device for implementing the procedure, consisting of an electrical stud-welding device with pivotally attached welding head, at least one stud holder being fastened in a detachable manner to that head; the stud holder can be axially shifted in a controlled fashion. It furthermore consists of a transfer station for the transfer of a stud from a feed arrangement to the stud holder, whereby the stud holder may be coaxially aligned with the transfer part of the transfer station, by pivoting the welding head.

In accordance with the invention, the device is characterized in that, outside the pivoting range of the welding head plus stud holder, there are arranged one next to the other, along a circular arc whose center is the pivot of the welding head, several transfer stations with their respective stud-feeding arrangements; in that in front of each transfer station (in the direction towards the welding head) there is a holding device for a stud holder, each holding device carrying a stud holder; and that the welding head features a coupling part that can be alternatively repositioned axially to one of the stud holders, each coupling part capable of being, at will, coupled to one of the stud holders that are readily prepared in the holding device, or uncoupled from one of the unloaded stud holders inserted into the holding device.

In so doing, it is particularly advantageous, in the case of a welding plane that is arranged vertically underneath the welding head, that the transfer stations plus holding devices and stud-feeding arrangement be arranged approximately vertically above the welding head, while maintaining these devices within a pivoting range of about 45° on either side of the vertical positions.

With this, it becomes possible to pick up the studs directly from the feeding arrangement such as the trough of a vibrator, without having to resort to an intermediate transfer station.

A preferred further development of the invention is one in which the stud-feeding arrangement consists of a vibrator that feeds suspended studs and features gripping-jaws that release the stud as soon as it has been transferred to the respective stud holder.

It is furthermore advantageous to lead the gripping jaws into the release position and back again, by means of a final-control element.

In a variant of the above, the final-control element consists of at least one pneumatic ram cylinder mounted on the transfer station, with which the gripping jaws can be thrust apart or retracted, in order to release the stud.

A preferred alternative is designing the stud holder as final-control element, the gripping jaws being capable of being spread apart by the stud holder, against spring pressure.

A further development envisages the gripping jaws forming an insertion channel for the tip of the stud holder, the channel being designed so as to taper in the direction of stud-holder insertion, from a radius that is at least slightly larger than the inserted end of the stud holder (particularly if that end is conical) down to the radius of the stud. In this fashion, in the transfer position the gripping jaws are spread apart by the stud holder, releasing the stud.

In order to ensure absolutely secure positioning of the stud in the stud holder, it is advantageous to provide a thrust pad behind the gripping jaws (in the direction of stud-holder insertion), against which the stud released by the gripping jaws may be thrust by the stud holder.

In order to allow for electrical sensing of such positioning, electrical contacts will be provided on the thrust pad, to be closed by the stud holder.

Another advantageous detail of the invention consists of mounting the stud holder on the welding head by means of automatic-release gripping jaws.

As a further development, it is proposed to have the gripping jaws spread by means of a pneumatic ram cylinder.

A variant of the above consists of providing on the stud holder a selflocking conical stub which can be inserted into a matching conical recess in the welding head; the stud holder is inserted so that it can be released by means of an ejector arranged coaxially with the recess.

It is advantageous to provide for pivoting of the welding head by means of an electric stepping motor.

It furthermore is operationally advantageous to provide for electronic control of the device.

Further details and examples of embodiments of the invention are represented in the drawing and are described more fully below.

The stud-welding device described below operates by the capacitor-discharge method; however, the invention is not restricted to this operating method, and can be used with welding devices using the drawn-arc principle.

Figure 1:
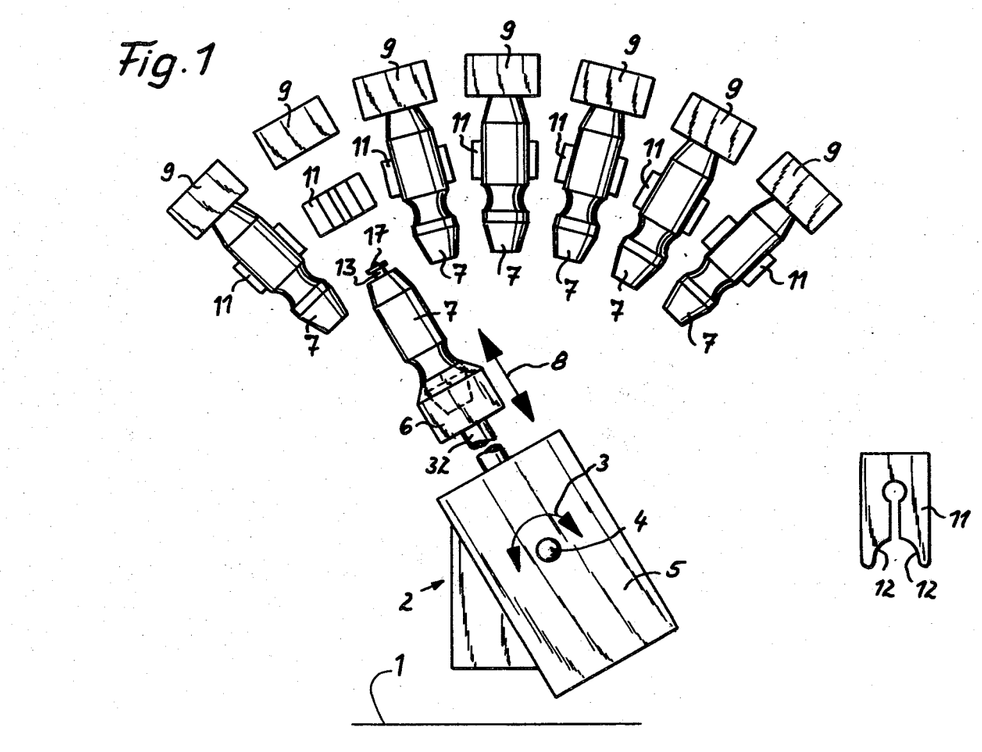
FIG. 1: illustrates a schematic representation of a device according to the invention, in frontal view.
Figure 4:
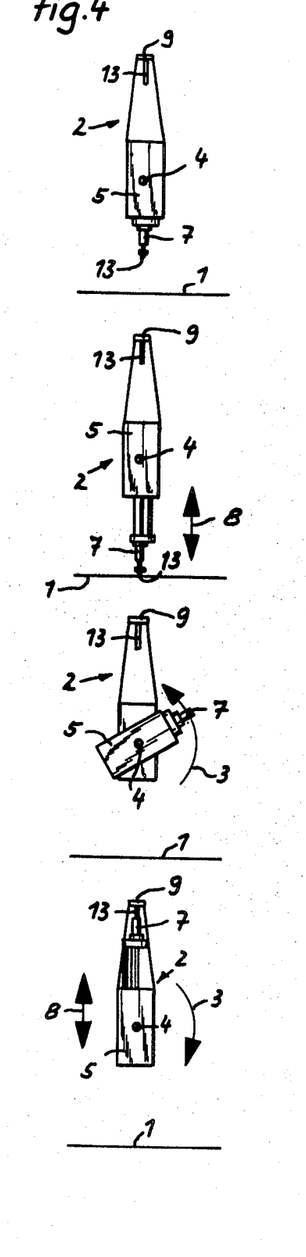
FIG. 4: illustrates in elevation representations in principle of the motions of a simplified stud-welding device.
Figure 5:
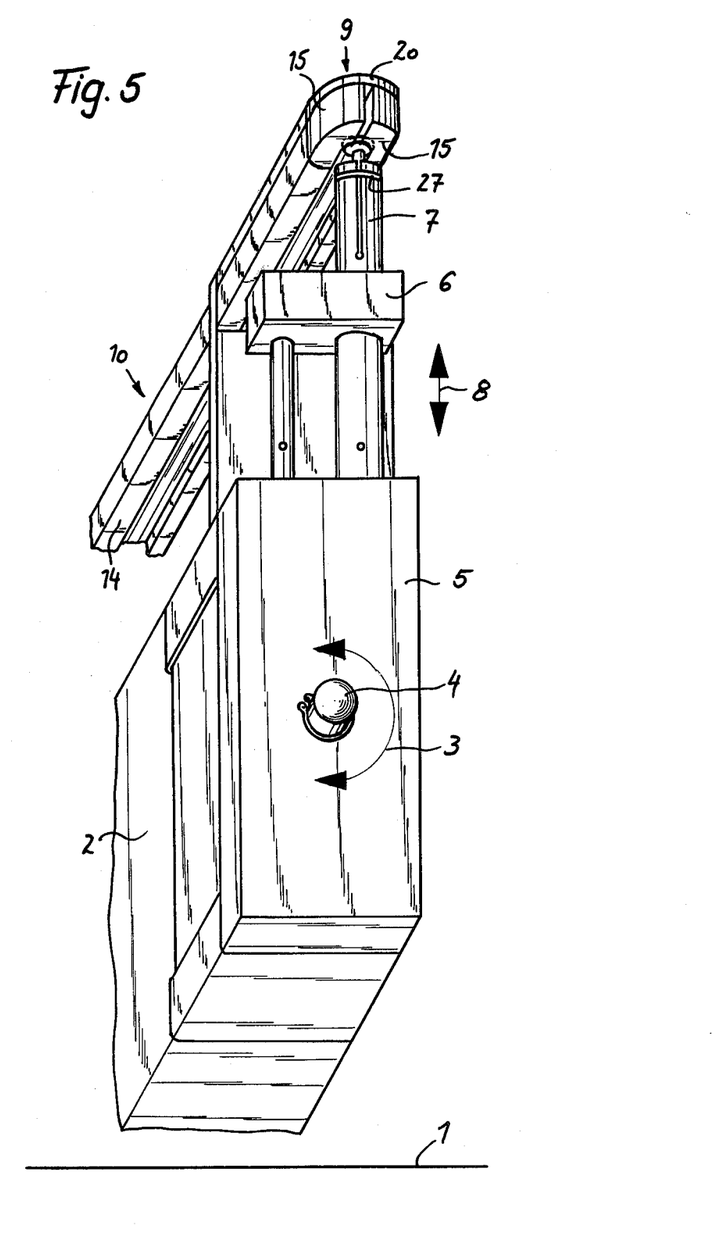
FIG. 5: illustrates in elevation a stud-welding device in the pickup position showing for simplicity, a single stud holder and a single stud feed.

The horizontal welding plane 1 is indicated schematically in FIGS., 4 and 5 1; on it, the workpieces, metal strips, etc. are guided underneath the welding device 2 and are suitably positioned for the welding process. Welding head 5 of stud-welding device 2 can be swung around pivot 4 in the direction of the arrow 3; the preferred drive is a stepping motor. The stud-welding device indicated schematically in FIG. 1 is designed for stationary use. A coupling part 6 is mounted on welding head 5, which head can be connected to a stud holder 7. Coupling part 6 may, for instance, be arranged so it can be repositioned in relation to welding head 5, in the direction of arrow 8, by means of a pneumatic cylinder. Outside the pivoting range of welding head 5 including stud holder 7, a number of transfer stations 9 are arranged along a circular arc whose center coincides with pivot 4 of welding head 5; each of the transfer stations features a stud-feeding arrangement 10. In front of each transfer station 9, a holding device 11 is rigidly arranged, for each stud holder 7. The stud holder in question can be delivered to the holding device by the coupling part of welding head 5, after proper positioning. Holding device 11, which is shown in detail in FIG. 1, top right, displays pincerlike gripping jaws 12; these permit, first, that stud holder 7 be axially inserted and, second, ensure that the inserted stud holder 7 is held with sufficient security.

The method of operation of this device is shown in greatly simplified form in FIG. 4. The uppermost illustration in FIG. 4 represents the stud-welding device with welding head 5, ready and prepared for welding; stud holder 7 is holding a stud 13, oriented vertically downward. By a lengthwise translation of stud holder including stud 13 to welding plane 1, which may be accomplished, say, pneumatcally, stud 13 is pressed onto the welding plane and electrically welded, e.g., by the capacitor-discharge method. This is shown in principle, in a top view, in the second figure. After welding stud 13, stud holder 7 is retracted towards welding head 5. In the retracted position, it is pivoted around pivot 4 to the position in which the stud holder of the respective holding device 14 (which, for simplicity's sake, is not shown in FIG. 4) is inserted. In order to be inserted into holding device 11, the stud holder is again longitudinally shifted in relation to welding head 5. As soon as stud holder 11 has been fed into holding device 11, stud holder 7 is detached from coupling part 6, the coupling holder being retracted towards welding head 5. Welding head 5 then pivots into the position in which it can pick up another stud holder equipped with another stud 13. Pickup of the stud holder is carried out in a fashion analogous to the delivery process. Next, welding head 5 pivots back into the welding-readiness position. Preferably, the moves to the various positions are controlled by processor.

It is preferred to arrange stations 9 plus holding devices 11 and the respective stud-feeding arrangements 10 approximately vertically above welding head 5; they are so arranged within a pivoting range of about 45° to each side from the vertical position. In that case, welding plane 1 is arranged vertically underneath welding head 5. This arrangement offers the advantage that a vibrator with a vibrator trough ending in transfer station 9 may be provided as stud-feeding arrangement 10. In that case, the studs are fed to transfer station 9 in a stable position, i.e., with their shanks hanging downward; the transfer station, without turning stud 13, holds said stud 13 in readiness for the respective stud holder 7. Furthermore, welding plane 1 is thereby kept completely clear of any components of the entire device. Variants of the stud feed and special designs thereof are schematically represented in detail in FIGS. 5 to 9.

According to FIG. 5, the stud-feeding arrangement 10 consists of a vibrator with a stud-feeding trough 14. Two gripping jaws 15 capable of being spread apart with spring action are provided as transfer station 9 at the end of said trough 14, as can be seen in greater detail in FIG. 7.

The studs 13 are conveyed forward in trough 14, with their shank hanging downward. The studs, which are round in the example, are equipped with a circular flange-edge 16 which rests on top of the rods that make up trough 14; arcing tip 17 of stud 13 freely projects upward from the trough. Gripping jaws 15 are hinged at the end of a rod forming trough 14 and are thrust apart by a spring 18, so that the inserted stud is held by gripping jaws 15. Furthermore, the inside of gripping jaws 15 thus features a receiving groove for flange-edge 16 of stud 13, so that the stud is secured in the gripping jaws in a manner that prevents it from shifting in an axial direction. As soon as the respective stud holder 7 has picked up stud 13, gripping jaws 15 are thrust—by means of a final-control element that will be described in greater detail below—into a position that releases stud 13. In the embodiment according to FIGS. 7 and 8, stud holder 7 itself serves as the final-control element for the swing-out motion for gripping jaws 15. In that case, gripping jaws 15 feature a conical infeed channel 19 on the underside facing stud holder 7, as can be seen in particular in FIG. 8. This allows the centered insertion of stud holder 7 into infeed channel 19, during the stud holder's advance for the purpose of picking up stud 13; as said advance proceeds, gripping jaws 15 are thrust apart, so that at the end stud 13 is released. In order to help ensure that stud 13 is picked up by stud holder 7 up to the stud's flange edge 16, a thrust pad 20 is provided above gripping jaws 15, attached to infeed trough 14. Thrust pad 20 has a slit for clearing the arcing tips of the studs 13 that are being supplied. In addition, thrust pad 20 may be equipped with electric contacts which are electrically connected by the stud 13 that is pressed against the pad, or by the stud's flange-edge 16. This permits, on the one hand, that the correct transfer may be recorded by means of an indicator arrangement, and on the other hand that electrical control-functions be effected, via the establishment of said contacts. Thus, for instance, the opening of gripping jaws 15 may be effected electrically or pneumatically, the opening process being started and timed by the contact established at thrust pad 20.

Figure 9:
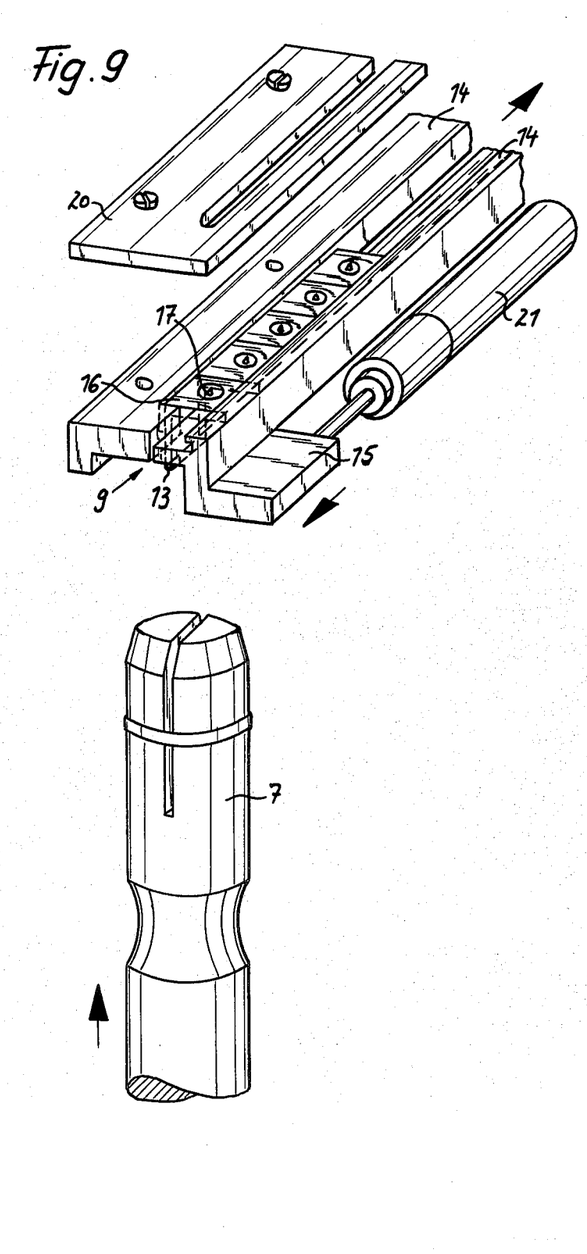
FIG. 9: represents a variant of vibrator and transfer position members in front view.

FIG. 9 represents a variant, in which the feed consists of studs 13 with a square base plate that forms flange-edge 16 and with a flat upright web part. These studs are fed to transfer station 9 via stud-feeding trough 14; at its end, the trough is narrowed in such a way that the foremost stud 13 may not be pushed out in a forward direction. In the embodiment of this example, a single gripping jaw or holding jaw 15 is provided; the jaw can be shifted in the longitudinal direction of trough 14, e.g. by a ram cylinder attached to trough 14. Shiftable gripping jaw 15, like the corresponding counterpart of the other trough-part, is equipped with an undercut; the flange-edge of the stud 13 that is in the transfer position can slide behind the undercut, thus ensuring that it is secured in an axially shiftproof manner. For transfer purposes, stud holder 7, matched to fit the web of the stud, is pushed onto the web of stud 13. As soon as the stud is correctly locked in stud holder 7, shiftable gripping jaw 15 is pushed forward (as shown in the drawing) by the plunger rod of ram cylinder 21. In this fashion, stud 13, picked up by stud holder 7, is clear and can be pushed out of transfer station 9, in a downward direction (in the drawing). The release of the ram cylinder may be triggered by electric contacts provided on the underside of gripping jaws 15, said contacts being closed by stud holder 7 as soon as the latter reaches the proper pickup position. Once again, this embodiment may feature, above guide trough 14 or above gripping jaws 15, a thrust pad 20 of appropriate shape and function.

Figure 10:
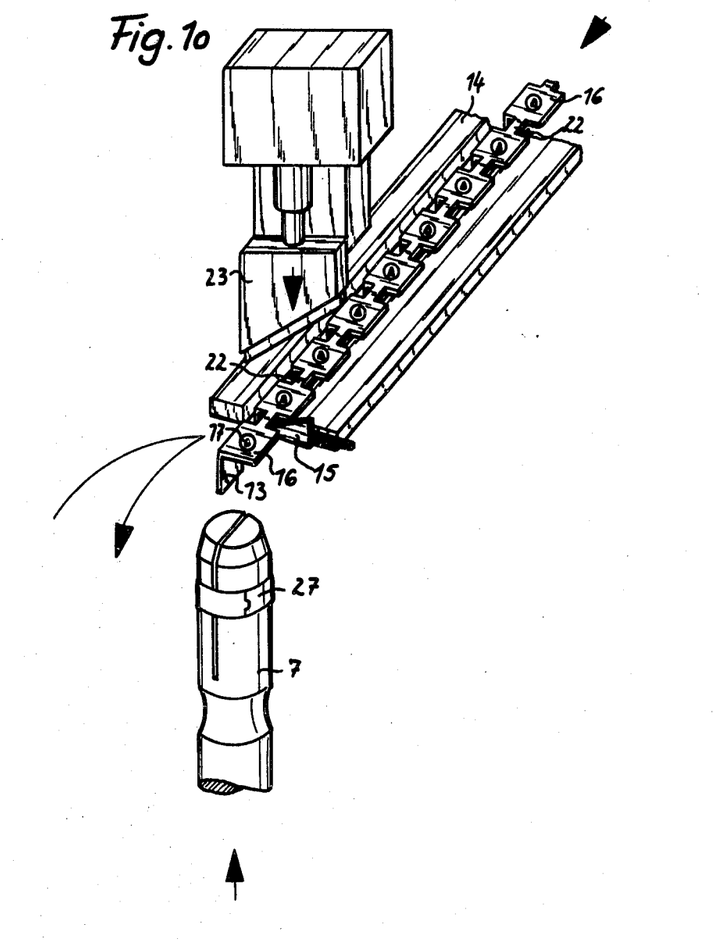
FIG. 10: represents another variant of the same parts of the device, in front view.

A further example of the design of the transfer station is represented in FIG. 10. There, studs 13 take the form of flat plug pins or a similar shape. Studs 13 are linked by thin material strips, before being picked up by stud holder 7. Material strip 22 is detached by a pneumatically actuated knife 23, as soon as stud holder 7 has gripped the stud in question, in the correct position. The opposing surface for knife 23 is formed by gripping jaw 15, shaped like a knife, which can be removed (e.g., pneumatically) out of the advance path of the stud holder plus stud.

Figure 6:
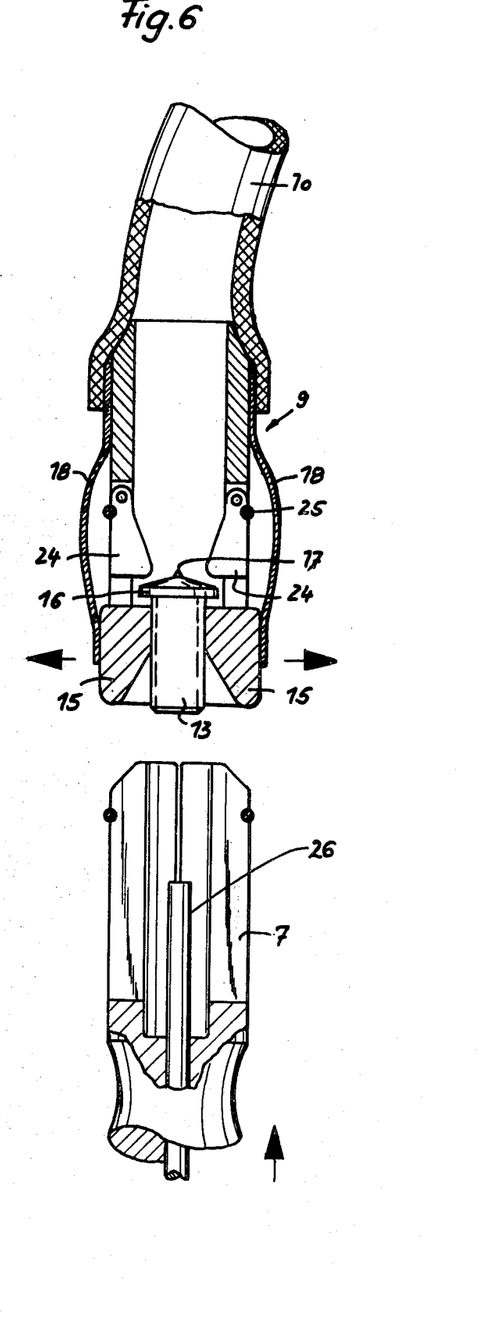
FIG. 6: is a fragmentary elevation, partly in section, of stud feed via a hose, in the pickup position.
Figures 7, 8:
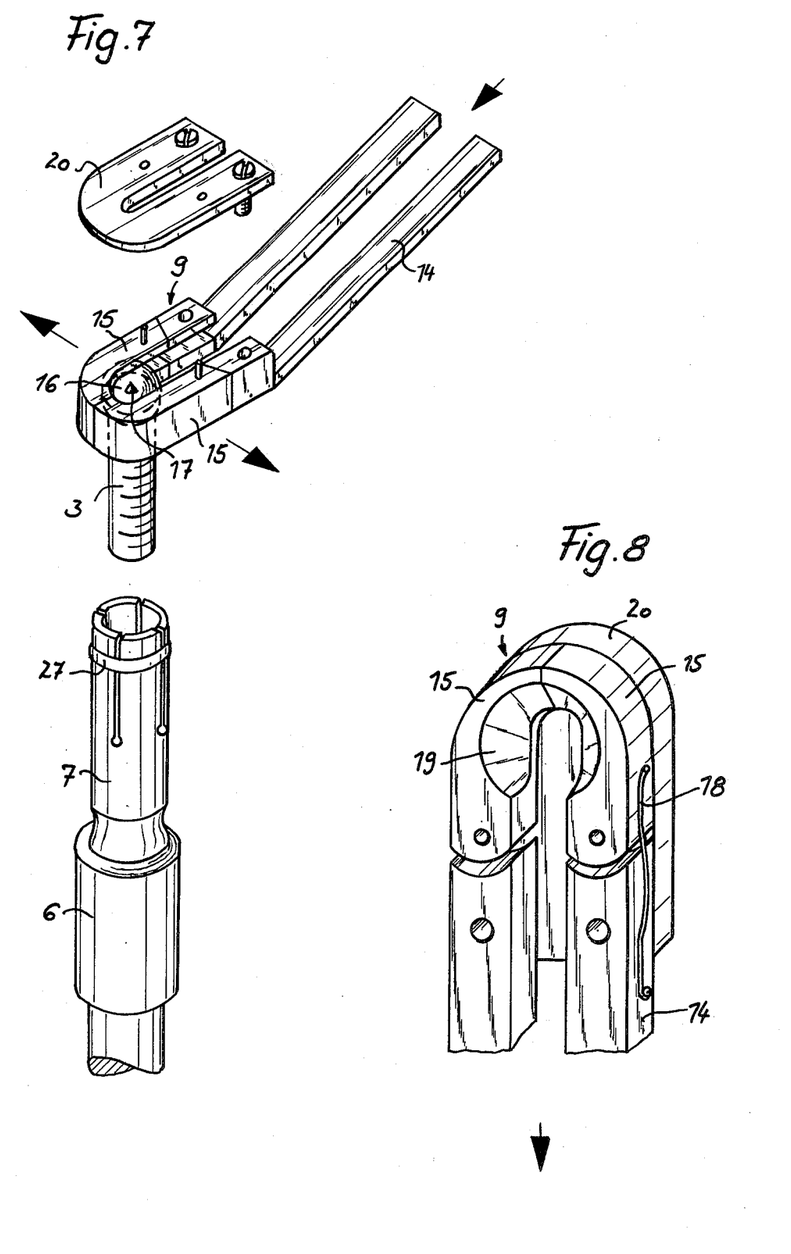
FIG. 7: is a detailed front view of a vibrator feed.
FIG. 8: shows the transfer part at the end of the vibrator trough, seen from below.

FIG. 6 represents a further variant of the stud transfer. Here, the stud-feeding arrangement 10 is a hose, which is particularly advantageous in the case of non-stationary welding devices, such as welding heads that are moved manually or by robot. Transfer station 9 is arranged coaxially at the hose end. It consists of gripping jaws 15 that can be spread apart against the action of leaf springs 18 and of further, spring-action check plates 24; the spring consists of spring ring 25. Stud 13, conveyed by hose 10 is pushed shank-forward through check plates 24, until flange-edge 16—having been thrust past check plates 24, with temporary spring-action of check plates 24—is held by spring jaws 15. In this preparatory position, stud holder 7 can be introduced from below between gripping jaws 15, grasping the stud shank and locking it. At the same time, the lower, straight checking surfaces of check plates 24 prevent the stud from being pushed back into the feed channel. As soon as stud holder 7 has completely picked up the stud shank, stud holder 7 is retracted and is delivered to a holding device 11. At the same time, the following stud 13 can be pushed into the preparatory position in transfer station 9. According to FIG. 6, stud holder 7 is equipped with an adjustable longitudinal stop 26, arranged in the pickup channel for stud 13, coaxially to the latter.

Figure 2:
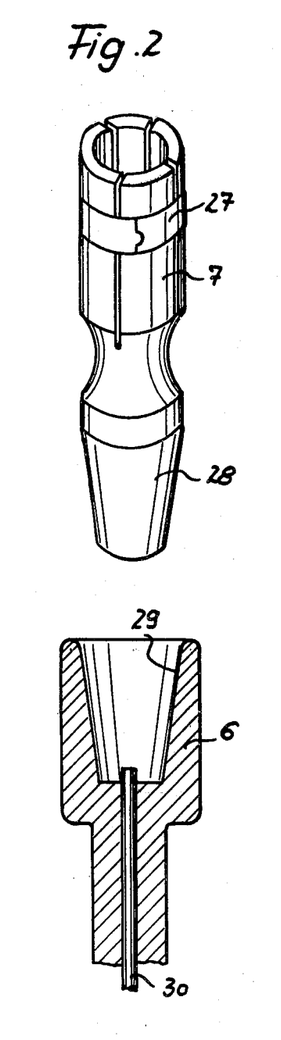
FIGS. 2-3: illustrate both in perspective and in vertical section components of the mechanisms for fastening the stud holder to an appropriately designed welding head.
Figure 3:
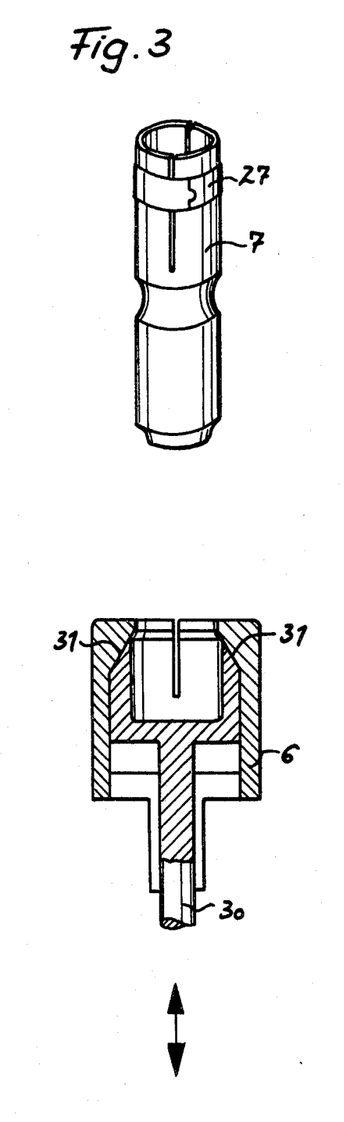

By means of this longitudinal stop the insertion depth of the respective stud 13 can be determind. Thus, for instance, longitudinal stop 26 can take the form of a threaded pin. In FIGS. 2 and 3, further details of coupling part 6 and associated stud holder 7 are represented. Stud holder 7 is a sleeve with a slit in its front side, equipped with a flat spring ring 27, so that, under spring pre-tension, it can hold and pick up the shank of an inserted stud 13.

On its rear side, the stud holder according to FIG. 2 is shaped as a selflocking cone 28. The associated coupling part 6 features a matching conical recess 29, whereby the stud holder and coupling part can be connected to one another, by axially pressing them together. In order to release stud holder 7 from coupling part 6, coupling part 6 is provided with an ejector 30 that may be actuated, for example, mechanically, magnetically or pneumatically. By means of pressure on the bottom of stud holder 7, the ejector pushes the stud holder out of recess 29. According to FIG. 3, the end of stud holder 7 is shaped cylindrically. the receiver of coupling part 6 being designed as a locking sleeve of matching cylindrical design. When stud holder and coupling part move towards each other, the end of stud holder 7 is automatically picked up by coupling part 6, the gripping jaws being temporarily spread apart. At the same time, separation is effected by, say, a pneumatically operated ejector 30 which, on the one hand, thrusts stud holder 7 out ot coupling part 6 and on the other hand spreads the jaws of coupling part 6 by means of appropriate tapered surfaces 31.

In concluding, it should be noted that coupling part 6 is linked with the welding head via a guide rod 32, which simultaneously serves to effect the electrical arrangement of the device. Either guide rod 32 itself is provided with a setting pinion that controls the inward and outward motion or (as shown in FIG. 5, for example), or a further plunger rod of a ram cylinder is provided, in addition to the guide rod. The plunger rod causes the repositioning of coupling part 6, while guide rod 32 merely fulfills guide functions.

All new characteristics disclosed in the specification and/or drawing, singly or in combination, are viewed as essential to the invention.

I claim:

1. A process for welding studs and similar parts to a workpiece by a stud-welding device operating at least semiautomatically, which process comprises supplying studs mechanically from an external source, individually and in weldable position, to a stud holder, holding the stud holder in a stud-holding device, moving it to welding position and welding the held stud, causing the stud-welding device to return the stud holder to transfer position ready to receive another stud; operatively associating a plurality of stud holders with the stud-welding device, alternatively connecting the stud holders to the stud-welding device in accordance with a selectable call-up program, so that a given stud holder equipped with a stud and connected to the stud-welding device is separated from the stud-welding device after the weld has been performed and the transfer position has been reached, and holding it in that position, the above procedural sequence being controlled electrically or electronically.

2. A process according to claim 1, wherein, for separating the stud holders from the stud-welding device, said stud holders are axially inserted into a holding device, equipping the respective stud holder with the next stud carried out synchronously during the insertion and picking up the studs directly by a stud feeding arrangement.

3. A device for carrying out the process of claim 1 comprising an electrical stud-welding device having a welding head pivotally attached thereto, to which welding head at least one stud holder is detachably fastened and which stud holder is shiftable axially in a controlled manner, a transfer station for the transfer of a stud from a feed arrangement to a stud holder, the stud holder being alignable coaxially with the transfer part of the transfer station by pivoting an associated welding head, and arranged outside of the pivoting range of the welding head including the stud holder, one next to the other along a circular arc whose center is the pivot of the welding head, a plurality of transfer stations with the respective stud-feeding arrangement, each transfer station, in the direction toward the welding head, being arranged, in alignment with the welding head, a holding device for a stud holder, each holding device carrying a stud holder, and the welding head having a coupling part alternatively repositionable axially with respect to one of the stud holders, which coupling part can be optionally coupled to one of the stud holders positioned in a holding device or uncoupled from one of the unloading stud holders in the holding device.

4. A device according to claim 3, wherein, in the case of a welding plane arranged vertically underneath a welding head, the transfer stations include a holding manner and a stud-feeding arrangement arranged approximately vertically over the welding head, the same being maintained within a pivoting range of about 45° on either side, starting from the vertical position.

5. A device according to claim 4, wherein the stud-feeding arrangement consists of a vibrator which feeds the studs while the studs are suspended, said vibrator having gripping jaws releasing the stud as soon as the transfer to the respective stud holder has been carried out.

6. A device according to claim 5 wherein gripping jaws are led to release position and back by a final-control element.

7. A device according to claim 6, wherein the final-control element comprises at least one pneumatic ram cylinder mounted on a transfer station and gripping jaws which can be forced apart or retracted by said cylinder, to release the stud.

8. A device according to claim 6, wherein the stud holder forms the final-control element in such manner that the gripping jaws can be spread by said stud holder against the pressure of a spring.

9. A device according to claim 8, wherein the gripping jaws form an insertion channel for the tip of the stud holder, which channel is shaped to taper in the direction of the stud holder's insertion, starting from a radius that is at least slightly larger than the insertion-end of the stud holder down to the radius of the stud, so that in the transfer position the gripping jaws are spread by the stud holder to release the respective stud.

10. A device according to claim 9, wherein a thrust pad is arranged behind the gripping jaws in the direction of the stud holder's insertion, against which thrust pad the stud picked up by the stud holder can be forced by the stud holder after the stud has been released by the gripping jaws.

11. A device according to claim 10, wherein electric contacts are arranged on the thrust pad connectible to the stud holder.

12. A device according to claim 11, wherein the stud holder is mounted on a welding head automatically by means of detachable gripping jaws.

13. A device according to claim 12, wherein the gripping jaws can be spread by a pneumatic ram cylinder.

14. A device according to claim 11, wherein the stud holder has a selflocking conical stud insertable into an appropriate conial recess of the welding head and said stud holder being so insertable as to be capable of release by an ejector arranged coaxially to a recess in the welding head.

15. A device according to claim 14, wherein a stepping motor is provided for pivoting the welding head.

16. A device according to claim 15, wherein an electronic control actuates the device.

* * * * *